Patented June 25, 1935

2,005,815

UNITED STATES PATENT OFFICE 2,005,815

MANUFACTURE OF META-CRESOL-METHYL-ETHER

Walter V. Wirth, Woodstown, N. J., assignor to E. I. du Pont de Nemours & Company, Wilmington, Del., a corporation of Delaware No Drawing. Application February 23, 1934, Serial No. 712,606

3 Claims. (Cl. 260—150)

This invention relates to organic compounds. More particularly it relates to an improved process for the manufacture of meta-cresol-methyl-ether.

Meta-cresol-methyl-ether is generally manufactured by reacting with dimethyl sulfate upon a mixture of meta-cresol and strong caustic soda solution. According to one method described in the art, about one mol of dimethyl sulfate is added to a mixture of one mol of meta-cresol dissolved in about one mol of 36° Bé. aqueous caustic soda at a temperature below 30° C., and the mixture then heated to 75° C. The reaction product was isolated by steam distillation, and purified by rectification. (Knoll and Wagner, Synthetische and Isolierte Riechstoffe, 2nd edition, page 226). The yield was not stated, but on repeating the process as directed, I found the yield to be about 80% of theory. This yield is not entirely satisfactory, and leaves too much unchanged meta-cresol. If the process is to be practiced on a commercial scale, it becomes necessary to follow the reaction by a special separation step to recover the unchanged meta-cresol. Moreover, in this process only one methyl group of the dimethyl sulfate is utilized as alkylating agent.

In another process, described by Ullmann and Uzbachian (Berichte, Vol. 36, page 1804), a ratio of 1.33 mols of dimethyl-sulfate to 1 mol of meta-cresol is employed. The yield is reported to be about 97% of theory. This process is clearly satisfactory as to yield, but the waste of dimethyl-sulfate is very high.

It is an object of my invention to provide a process for methylating meta-cresol, which is characterized by both high yield and great economy of initial materials. It is a further object of my invention to provide a process in which no substantial quantities of unchanged meta-cresol are left over, thereby obviating the necessity of special steps for recovering the same. Other and further important objects of this invention will appear as the description proceeds.

I have found that by conducting the process in a certain special manner, as more fully set forth below, it is possible to utilize to a substantial degree the second methyl group of the dimethyl sulfate. Each molecule of dimethyl sulfate thus serves to methylate two molecules of meta-cresol, in accordance with the following equations:

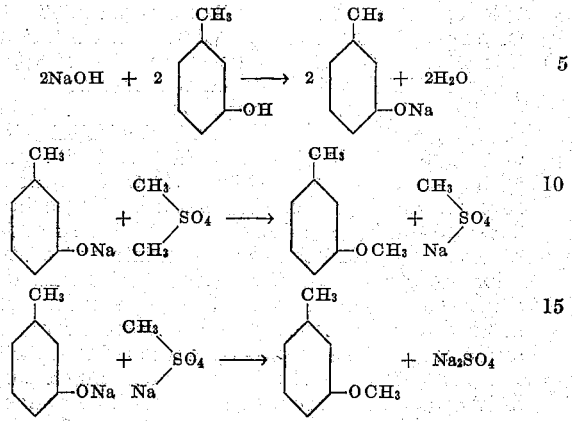

This effect is rather surprising, because monomethyl-sodium-sulfate is generally not known to be capable of acting as a methylating agent in aqueous solution.

My process consists of conducting the reaction in two steps. The first step is run along substantially parallel lines with the procedure of Knoll and Wagner above mentioned, except that I use considerably less than one mol of dimethyl-sulfate per mol of meta-cresol. The exact quantity may be varied considerably, but for highest efficiency it should not be less than about 0.55 to 0.60 mols, which corresponds to an excess of about 10 to 20% over theory, assuming that dimethyl sulfate is capable of furnishing two methyl groups.

The reaction then proceeds as in Knoll & Wagner, and stops at a point where a considerable quantity of meta-cresol remains unmethylated. I then feed into the hot reaction mass caustic soda at a carefully regulated rate, depending on the rate of reaction. This additional caustic soda encourages reaction between the monomethyl-sodium-sulfate formed in the first step of the process and the residual meta-cresol. The effect is thus not only that I force the intermediate methyl-sodium-sulfate to give up its methyl group, thereby reducing the initial quantity of dimethyl-sulfate required for the reaction, but I also consume substantially all of the residual meta-cresol, thereby increasing the yield of the desired methyl ether and obviating the necessity of subjecting the mass to a separation procedure to recover meta-cresol.

It is remarkable that the addition of an initially excessive quantity of caustic soda fails to accomplish the objects of this invention, but on the contrary decomposes the dimethyl-sulfate, or its intermediate by-product methyl-sodium-sulfate, into methanol and sodium sulfate, thereby further decreasing the yield of the desirable 3-methoxy-toluene.

Without limiting my invention to any particular procedure, the following example, in which parts by weight are given, will serve to illustrate my preferred mode of operation:

Example

A cast-iron kettle equipped with an agitator, reflux condenser, and jacket for heating and cooling, was charged with 108 parts (1 mol) of m-cresol. 133.2 parts of 30% sodium hydroxide solution (1 mol) were added over ¼ to ½ hour, while keeping the temperature down at 30–33° C. The mass was then stirred for 15 minutes and 77.5 parts of dimethyl sulfate, (97.5%; 0.6 mol) were gradually added at 30–33° C. over a period of 1½ hours. The mass was then heated to 97–100° C., and 26.6 parts of 30% sodium hydroxide solution were gradually added over a period of 3½ to 4 hours, while holding the temperature at 97–100° C. The addition of caustic soda was regulated so as to maintain throughout a slight alkalinity test on Clayton Yellow paper (pH 11.5–12.5). The temperature was held at 97–100° C. for 3 hours further. 150 parts of cold water and 4 parts of 30% sodium hydroxide solution were then added to dissolve crystallized sodium sulfate and a little unchanged m-cresol, respectively. The mass was cooled to 35° C. and settled about 1 hour. The bottom aqueous layer was separated from the crude ether. The oil was then washed twice with 150 parts of 10% salt solution, containing 4 parts of 30% caustic solution and then with two washes of 150 parts of 10% salt solution. The first two washes were distinctly alkaline to Clayton Yellow paper and the last wash was only slightly alkaline on brilliant yellow paper (pH 7 to 9).

The yield of crude washed m-cresol-methyl-ether was 118 parts. The ether was vacuum distilled at 50 mm. absolute pressure to remove traces of water and inorganic impurities. The main fraction, boiling at 92–93° C., was a clear water white oil, boiling at 176.5° to 178.5° C. at atmospheric pressure.

It will be readily apparent that my preferred process may be modified in many ways without departing from the principles of this invention.

For example, the concentration of the sodium-cresolate solution may be varied over a wide range. Further, other alkalies, such as potassium hydroxide, may be substituted for the sodium hydroxide used in the above process. Likewise, the time consumed in making the "first methylation" at the lower temperature and the "second methylation" at the higher temperature is subject to considerable variation.

The temperature involved in either stage of the reaction may be varied within wide limits. In the first stage it is not recommended to go above 30–35° C., since higher temperatures encourage decomposition of the dimethyl sulfate. The temperature in the second stage is limited by the reflux temperature of the mixture, unless pressure apparatus be used, to which, however, there would be no advantage.

It is desirable, and recommended for best results, to avoid excessive quantities of alkali during the entire procedure, beyond that necessary to convert the original quantity of meta-cresol into alkali-metal cresolate, and to reconvert whatever portions of this cresolate have hydrolized into free cresol during the process.

The important advantages of my improved process will now be readily apparent.

1. Methylation of meta-cresol is effected with less than a molar equivalent of methyl-sulfate, with an obvious saving in the cost of the methylating agent.

2. The methylation operation may be carried out in aqueous solution, in simple apparatus, with a low consumption of labor, power, etc.

3. High yields of the ether are obtained in a single methylation, obviating the necessity for recovering unchanged meta-cresol.

I claim:

1. A process for manufacturing the methyl-ether of meta-cresol, which comprises feeding into an aqueous solution of an alkali-metal-meta-cresolate a quantity of dimethyl sulfate, corresponding to between one-half and one mol per mol of the cresolate, heating the mass until the reaction has reached a point of substantial equilibrium, and then feeding in aqueous caustic alkali at a rate not higher than that required to maintain the mass at a slight alkalinity to Clayton yellow paper.

2. A process for the manufacture of meta-cresol-methyl-ether, which comprises adding about 0.55 to 0.60 mols of dimethyl sulfate to an aqueous solution of substantially 1.0 mol of sodium-meta-cresolate, heating the mass until the reaction has substantially reached equilibrium, feeding in caustic soda at a rate not higher than necessary to maintain the mass at a pH of about 11.5 to 12.5, and recovering the methyl-cresol-ether formed in the reaction.

3. A process for the manufacture of meta-cresol-methyl-ether, which comprises dissolving substantially 1 mol of meta-cresol in water by the aid of substantially 1 mol of caustic soda, adding about 0.6 mols of dimethyl sulfate while keeping the temperature from rising above 33° C., heating the mass substantially to reflux, adding to the hot mass substantially 0.2 moles of caustic soda at a rate sufficient to maintain the mass slightly alkaline to Clayton yellow, continuing the heating until reaction is substantially complete, diluting the mass with water and alkali, and recovering the oily phase containing meta-cresol-methyl-ether.

WALTER V. WIRTH.